(12) United States Patent
Ueno

(10) Patent No.: US 6,342,920 B2
(45) Date of Patent: *Jan. 29, 2002

(54) PHOTOELECTRIC CONVERSION DEVICE

(75) Inventor: Isamu Ueno, Hadano (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,298

(22) Filed: Sep. 29, 1999

Related U.S. Application Data

(62) Division of application No. 08/805,968, filed on Feb. 25, 1997.

(30) Foreign Application Priority Data

Feb. 27, 1996 (JP) ................................ 8-39614

(51) Int. Cl.[7] .............................................. H04N 5/335
(52) U.S. Cl. .................... 348/303; 348/308; 348/230; 348/241
(58) Field of Search ................................. 348/229, 230, 348/241, 294, 302, 303, 308, 314, 164, 242, 250; 257/229, 230

(56) References Cited

U.S. PATENT DOCUMENTS

| | | | | |
|---|---|---|---|---|
| 4,743,959 A | | 5/1988 | Frederiksen | 348/396 |
| 4,866,496 A | | 9/1989 | Audier | 357/24 |
| 5,003,565 A | * | 3/1991 | Yoshida | 257/239 |
| 5,146,302 A | * | 9/1992 | Kumada | 257/225 |
| 5,326,996 A | * | 7/1994 | McNutt | 257/229 |
| 5,345,266 A | * | 9/1994 | Denyer | 348/302 |
| 5,717,199 A | * | 2/1998 | Carbone et al. | 348/308 |
| 6,064,431 A | * | 5/2000 | Ueno | 348/241 |

FOREIGN PATENT DOCUMENTS

| | | |
|---|---|---|
| EP | 0251386 | 1/1988 |
| JP | 7-48826 | 6/1990 |

OTHER PUBLICATIONS

"Charge Skimming Transfer Scheme", IEEE trans. Electron., vol. ED–29, p. 3, 1982.

Chow et al., "Hybrid Infrared Focal–Plane Arrays," I.E.E.E. Trans. on Electron Devices, vol. ED–29, No. 1, pp. 3–13, Jan. 1982.

* cited by examiner

Primary Examiner—Wendy R. Garber
Assistant Examiner—Jacqueline Wilson
(74) Attorney, Agent, or Firm—Fitzpatrick, Cella, Harper & Scinto

(57) ABSTRACT

This invention provides an element having a skimming charge transfer function in an X-Y address type photoelectric conversion device using, e.g., a CMOS sensor, and a photoelectric conversion device, which accumulates photoelectric signal charges produced by a photoelectric conversion element in a control electrode (gate) of a MOS transistor so as to obtain a signal with a high S/N ratio by removing signal components produced by background radiation without using any CCD as an accumulation means of skimming charges, has a skimming electrode for transferring skimming charges of those produced by the photoelectric conversion element, an $n^+$-type region for accumulating the transferred skimming charges, a MOS transistor for reading out potential changes caused by the skimming charges, and a circuit for automatically controlling the amount of skimming charges to be transferred.

14 Claims, 10 Drawing Sheets

PHOTOELECTRIC CONVERSION DEVICE

This application is a division of application Ser. No. 08/805,968, filed Feb. 25, 1997.

BACKGROUND OF THE INVENTION

1. Field of the Invention

The present invention relates to a photoelectric conversion device, for example, to one-dimensional or two-dimensional photoelectric conversion devices for reading images in a video camera, X-ray imaging apparatus, infrared ray imaging apparatus, and the like and, more particularly, to a photoelectric conversion device using a skimming charge transfer scheme.

2. Related Background Art

Conventionally, CCDs are popularly used as imaging devices of video cameras, digital cameras, and the like, and such image reading device uses a "charge skimming transfer scheme" disclosed in, e.g., IEEE trans. Electron. vol. ED-29, p. 3, 1982 and Japanese Patent Publication No. 7-48826.

FIG. 13 shows an infrared ray imaging apparatus using the conventional charge skimming transfer scheme described in Japanese Patent Publication No. 7-48826. FIGS. 12A and 12B show changes in charge amount before and after charge skimming transfer, and FIGS. 11A to 11C show the input circuit of a charge skimming transfer type infrared ray imaging element.

FIGS. 11A to 11C and FIG. 13 illustrate a photodiode 101, a silicon CCD 102, infrared rays 104, an output circuit 105, an input gate electrode 110, an accumulation electrode 111, a skimming electrode 112, a CCD electrode 113, an overflow drain 114, an overflow electrode 115, and a skimming voltage input terminal 119.

In FIGS. 12A and 12B, charges 116 are produced due to background radiation, charges 117 are ascribed to radiation from a signal source, and charges are skimmed at a skimming level 118.

The operation of the charge skimming transfer type infrared ray imaging element with the above arrangement will be described below with reference to the drawings.

(1) As shown in FIG. 11A, infrared rays 104 are converted into photocurrents by the photodiode 101, and the photocurrents are input to and accumulated in a portion beneath the accumulation electrode 111 via the input gate electrode 110.

(2) Upon completion of accumulation, as shown in FIG. 11B, a pulse signal is applied to the skimming electrode 112 to change the height of the potential well to transfer some accumulated charges to a portion underneath the CCD electrode 113. The amount of charges to be transferred is controlled by the pulse signal (to be referred to as a skimming voltage hereinafter) to be applied to the skimming electrode 112.

(3) Thereafter, as shown in FIG. 11C, charges remaining in the portion beneath the accumulation electrode 111 are ejected to the overflow drain 114 via the overflow electrode 115.

When charge skimming transfer is performed, as described above, since DC components 116 produced by the background radiation can be removed, as shown in FIGS. 12A and 12B, contrast can be emphasized, and the amount of charges to be transferred to the portion beneath the CCD electrode 113 can be reduced.

Charges transferred to the portion below the CCD electrode 113 are sequentially transferred by the CCD 102 in the same manner as in a case wherein the charge skimming transfer scheme is not adopted, and are output to an external circuit via the output circuit 105.

As described above, in the conventional photoelectric conversion device, when the number of photons of background radiation is extremely larger than the number of photons radiated by the signal source, the obtained signal has low contrast, and such problem cannot be solved by merely extending the accumulation time of the silicon CCD. In the above-mentioned prior art, this problem is solved by performing skimming charge transfer. However, since the skimming voltage is calculated and generated by an external circuit on the basis of the signal voltages of the respective pixels, other problems such as a long processing time, high cost of the entire system, and the like are posed.

On the other hand, an X-Y address type photoelectric conversion device, which uses a CMOS sensor or the like in place of the CCD and comprises a charge skimming transfer means, has not reached practical application level yet.

SUMMARY OF THE INVENTION

It is an object of the present invention to provide an element comprising a skimming charge transfer function in an X-Y address type photoelectric conversion device using, e.g., a CMOS sensor and having excellent characteristics.

It is an object of the present invention to provide a photoelectric conversion element and a control method therefor for transferring an optimum amount of photoelectric charge from a photoelectric conversion means and outputting a signal corresponding to the amount of photoelectric charge transferred.

In order to attain the above-described object, according to one aspect of the present invention, a photoelectric conversion device includes a plurality of pixels. Each pixel includes photoelectric conversion means for converting light into photoelectric charges, transfer means for transferring a portion of the photoelectric charges from the photoelectric conversion means, and reading means for non-destructively outputting a signal corresponding to the portion of the photoelectric charges transferred by the transfer means. The photoelectric conversion device further includes controlling means for controlling an amount of photoelectric charges transferred by the transfer means.

According to another aspect of the present invention, the controlling means includes pulse setting means for changing a pulse signal, and the controlling means controls the amount of photoelectric charges transferred in response to an output from the pulse setting means.

According to another aspect of the present invention, the controlling means controls an amount of photoelectric charge transferred based on the signal output by the reading means.

According to another aspect of the present invention, the controlling means controls the transfer means by a method that includes a first step of controlling the transfer means according to a first control signal and a second step of controlling the transfer means according to a second control signal that differs from the first control signal.

Other objects and features of the present invention will become apparent from the following description of the embodiments taken in conjunction with the accompanying drawings.

DETAILED DESCRIPTION OF THE PREFERRED EMBODIMENTS

The preferred embodiments of the present invention will be described in more detail hereinafter with reference to the accompanying drawings.

Figure 1A:
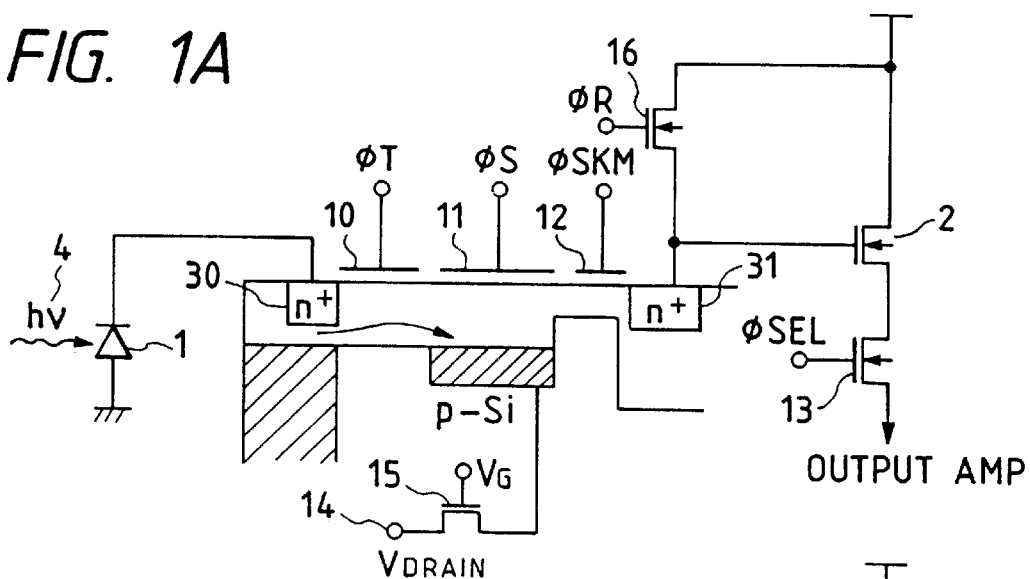
FIGS. 1A to 1C are circuit diagrams showing a circuit for one pixel and a skimming charge transfer scheme according to the first embodiment of the present invention.
Figure 1B:
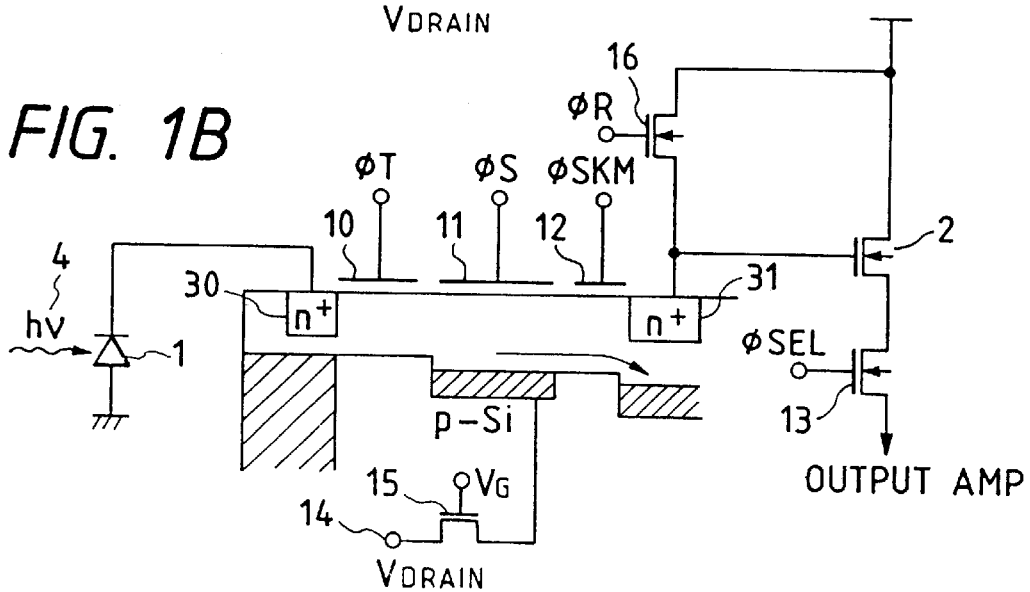
Figure 1C:
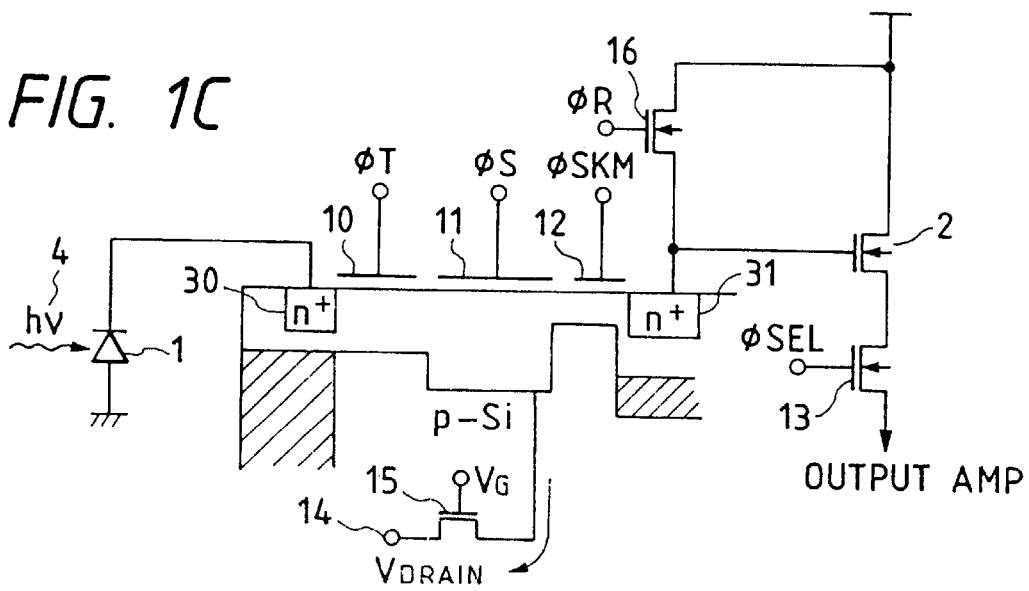

FIGS. 1A to 1C show the sectional structure and peripheral circuits of a photoelectric conversion element according to the first embodiment of the present invention, and also illustrate the charge skimming transfer processes.

Referring to FIGS. 1A to 1C, a photoelectric conversion device comprises a photodiode 1, which is illustrated as a circuit element on the circuit diagram for the sake of simplicity (however, an actual photodiode 1 is constituted by the p-n junction between a p-type semiconductor substrate and an $n^+$-type diffusion layer 30; the same applies to the photodiode shown in the other figures). The device also comprises a driver MOSFET 2 for outputting a signal. The drain terminal of the MOSFET 2 is connected to an output line via a selection switch 13, and a resistive load or constant current load (not shown) is inserted in the output line. The load element and the driver MOSFET 2 constitute an amplifier. The device further comprises an input gate electrode 10, an accumulation electrode 11, a skimming electrode 12, and a MOS switch 16 for resetting the floating gate of the MOSFET 2.

Such photoelectric conversion device accumulates photoelectric signal charges produced by a photoelectric conversion means 1 in the control electrode (gate) of a MOS transistor 2, and is characterized by comprising:

a skimming electrode 12 serving as means for transferring skimming charges of those produced by the photoelectric conversion means 1;

an $n^+$-type region 31 serving as means for accumulating the transferred skimming charges;

a MOS transistor 2 serving as means for reading out potential changes caused by the skimming charges; and means (to be described later with reference to FIG. 2) for automatically controlling the amount of skimming charges to be transferred.

Also, a photoelectric conversion device is characterized by comprising:

photoelectric conversion means consisting of a first diffusion layer 30 which is formed on a semiconductor substrate of one conductivity type and is doped with an impurity of a conductivity type opposite to the one conductivity type;

a transfer electrode 10 for transferring photoelectric charges produced by the photoelectric conversion means;

an accumulation electrode 11 for accumulating the transferred photoelectric charges;

a skimming electrode 12 for transferring skimming charges of the accumulated photoelectric charges;

a second diffusion layer 31 of the opposite conductivity type for accumulating the skimming charges;

means 2, connected to the second diffusion layer 31, for outputting potential changes caused by the skimming charges onto an output line; and means 14 and 15 for resetting charges which remain after the skimming charges are transferred.

The charge skimming transfer operation of this embodiment will be described below with reference to the drawings.

(1) As shown in FIG. 1A, light 4 is converted into photocurrents by the photodiode 1 as the photoelectric conversion means, and the photocurrents are input to and accumulated in a portion beneath the accumulation electrode 11 via the input gate electrode 10.

(2) Upon completion of accumulation, as shown in FIG. 1B, a pulse signal is applied to the skimming electrode 12 to change the height of the potential well, and some accumulated charges (skimming charges) are transferred to the $n^+$-type diffusion layer 31 connected to the floating gate of the MOS transistor 2. The amount of charges to be transferred is controlled by the pulse signal (skimming voltage) to be applied to the skimming electrode 12.

(3) Thereafter, as shown in FIG. 1C, residual charges underneath the accumulation electrode 11 are ejected to the overflow drain 14 via the overflow electrode 15.

Figure 12A:
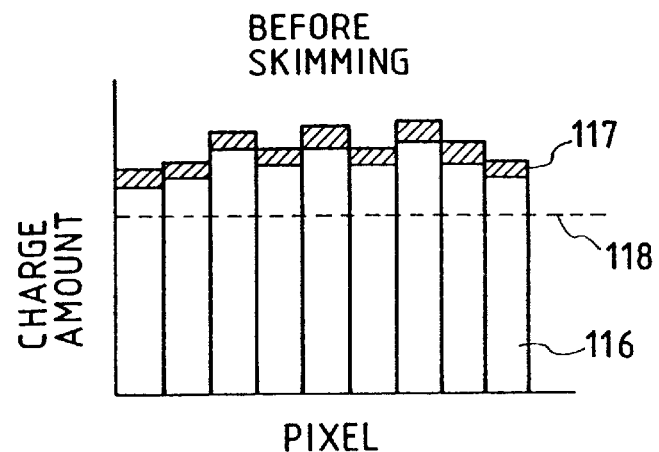
FIGS. 12A and 12B are graphs showing the relationship between the skimming operation and the charge amount.
Figure 12B:
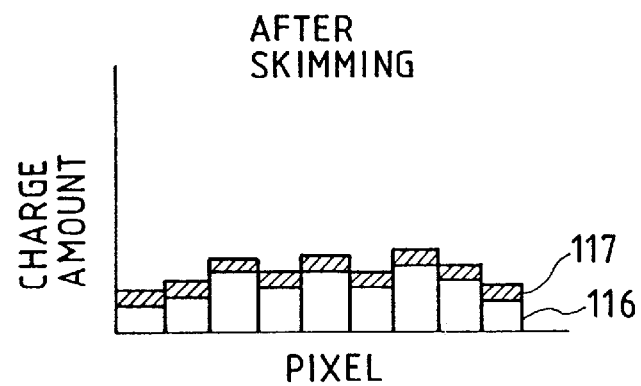
Figure 13:
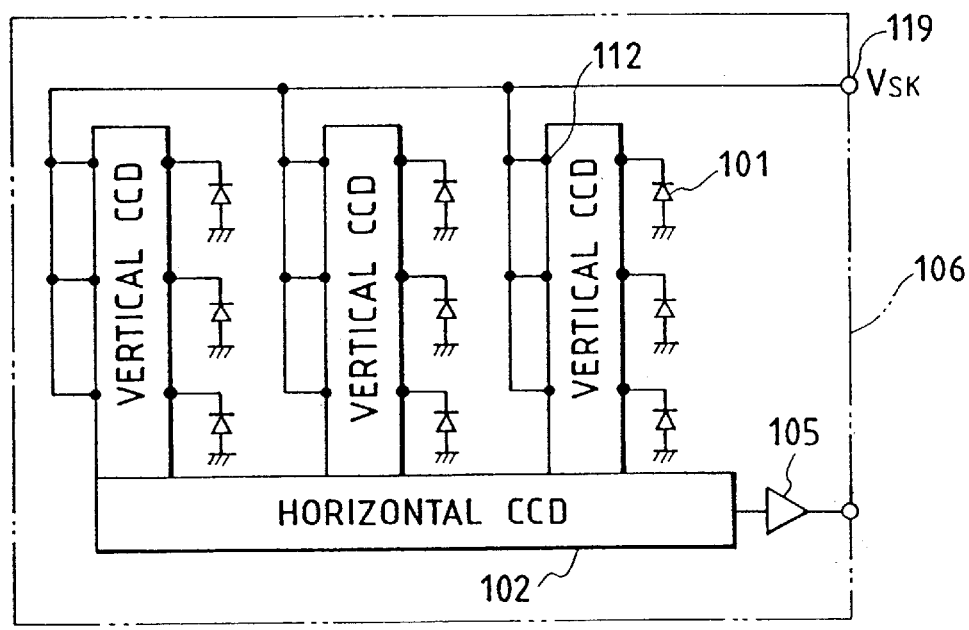
FIG. 13 is a circuit diagram for explaining the conventional charge skimming scheme.

When charge skimming transfer is performed, as described above, since DC components 116 produced by the background radiation can be removed, as shown in FIGS. 12A and 12B, contrast can be emphasized, and a signal with a high S/N ratio can be obtained.

By appropriately repeating the operations (1) to (3), the background signal components can be removed, and a signal with a higher S/N ratio can be obtained.

In this embodiment, since signal charges can be non-destructively read out, the skimming amount can be automatically optimized by reading signals during the accumulation period, and setting the skimming voltage based on, e.g., a voltage corresponding to the maximum signal of skimming charges of all the pixels.

In pixels having the photoelectric conversion means, signals may be read out in units of pixel blocks, and the skimming amount can be controlled by a skimming voltage corresponding to the minimum voltage of the readout signals in units of pixel blocks. Such control in units of clocks can be realized by controlling scanning circuits for scanning the respective pixels to locally scan the pixels.

Figure 2:
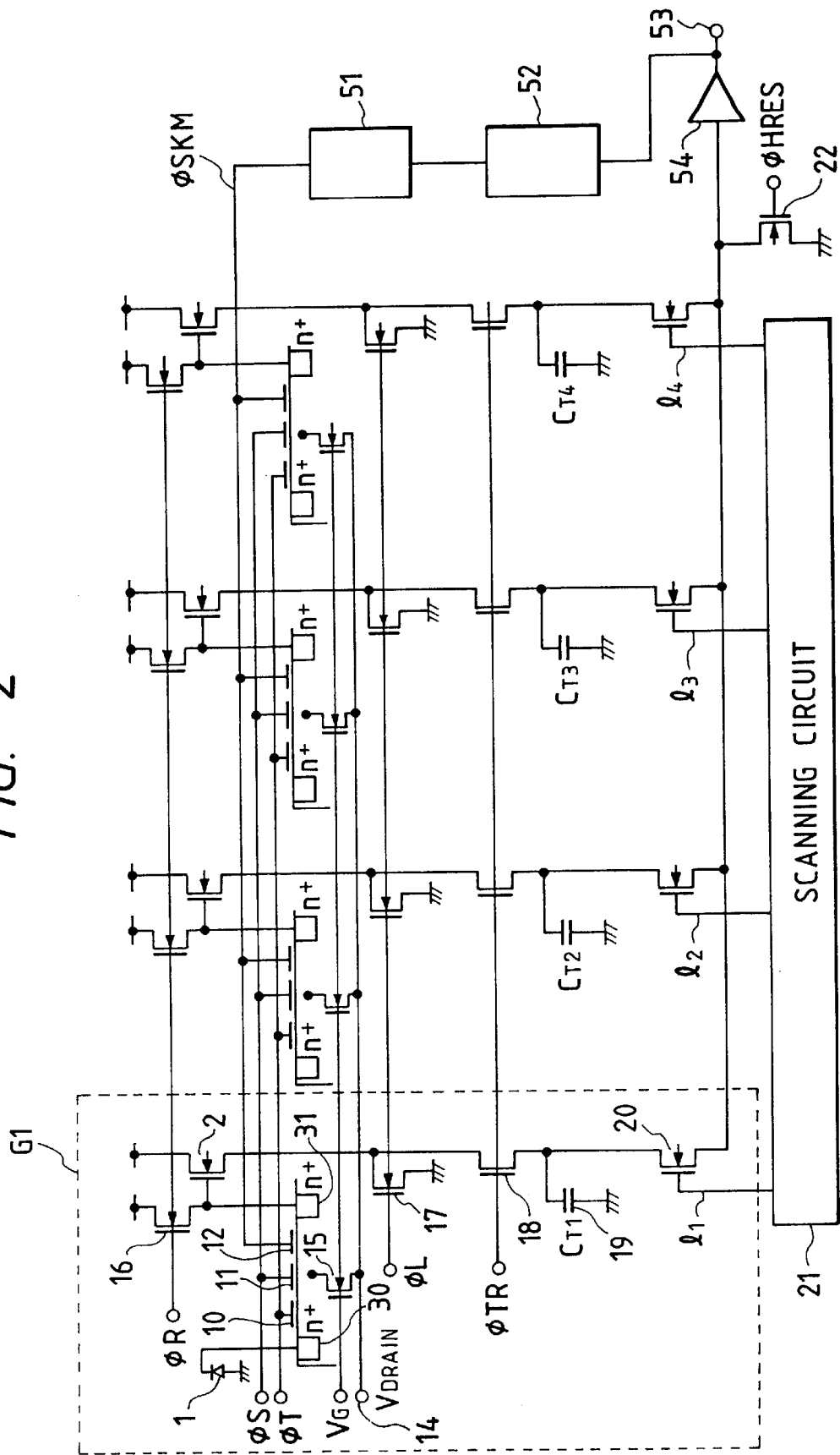
FIG. 2 is a circuit diagram of the first embodiment of the present invention.

FIG. 2 is a schematic circuit diagram showing a MOS linear sensor as an example of the photoelectric conversion device of the first embodiment described above with reference to FIGS. 1A to 1C. FIG. 2 shows circuits for four pixels, and a dotted line portion G1 as a peripheral circuit for one pixel will be explained below. Note that the selection switch 13 in FIGS. 1A to 1C is not shown in FIG. 2.

In FIG. 2, the circuit comprises a photodiode 1 serving as a photoelectric conversion means, which is illustrated as a circuit element on the circuit diagram for the sake of simplicity (however, an actual photodiode 1 is constituted by the p-n junction between a p-type semiconductor substrate and an $n^+$-type diffusion layer 30; the same applies to the photodiode shown in the other figures). The circuit also comprises a driver MOSFET 2 for outputting a signal. The drain terminal of the MOSFET 2 is connected to an output line, and a MOSFET 17 serving as a load resistor is inserted in the output line. The load element 17 and the driver MOSFET 2 constitute a source-follower amplifier for each pixel. The circuit further comprises an input gate electrode 10, an accumulation electrode 11, a skimming electrode 12, and a MOS switch 16 for resetting the floating gate of the MOSFET 2.

The circuit further comprises an overflow drain 14 and a MOSFET 15 serving as an overflow control switch.

Moreover, the sensor comprises an automatic skimming voltage control circuit 51, and a circuit 52 for detecting the maximum value of skimming charges of each pixel.

The circuits 51 and 52 as means for automatically controlling the skimming charge amount detect the maximum signal of skimming charges, and compare it with a proper signal level. When the maximum signal of the skimming charges is smaller than the proper signal level, the means controls the skimming voltage to increase the amount of skimming charges; otherwise, the means controls the skimming voltage to decrease the amount of skimming charges.

In FIG. 2, the skimming electrode 12 serves as means for transferring skimming charges of those produced by the photoelectric conversion means, the automatic skimming voltage control circuit 51 and the maximum value detection circuit 52 for detecting the maximum value of skimming charges of each pixel serve as means for controlling the amount of skimming charges to be transferred, an $n^+$-type region 31 serves as means for accumulating the transferred skimming charges, and the MOS switch 15 serves as means for resetting charges which remain after the skimming charges of those produced by the photoelectric conversion means are transferred.

Figure 3:
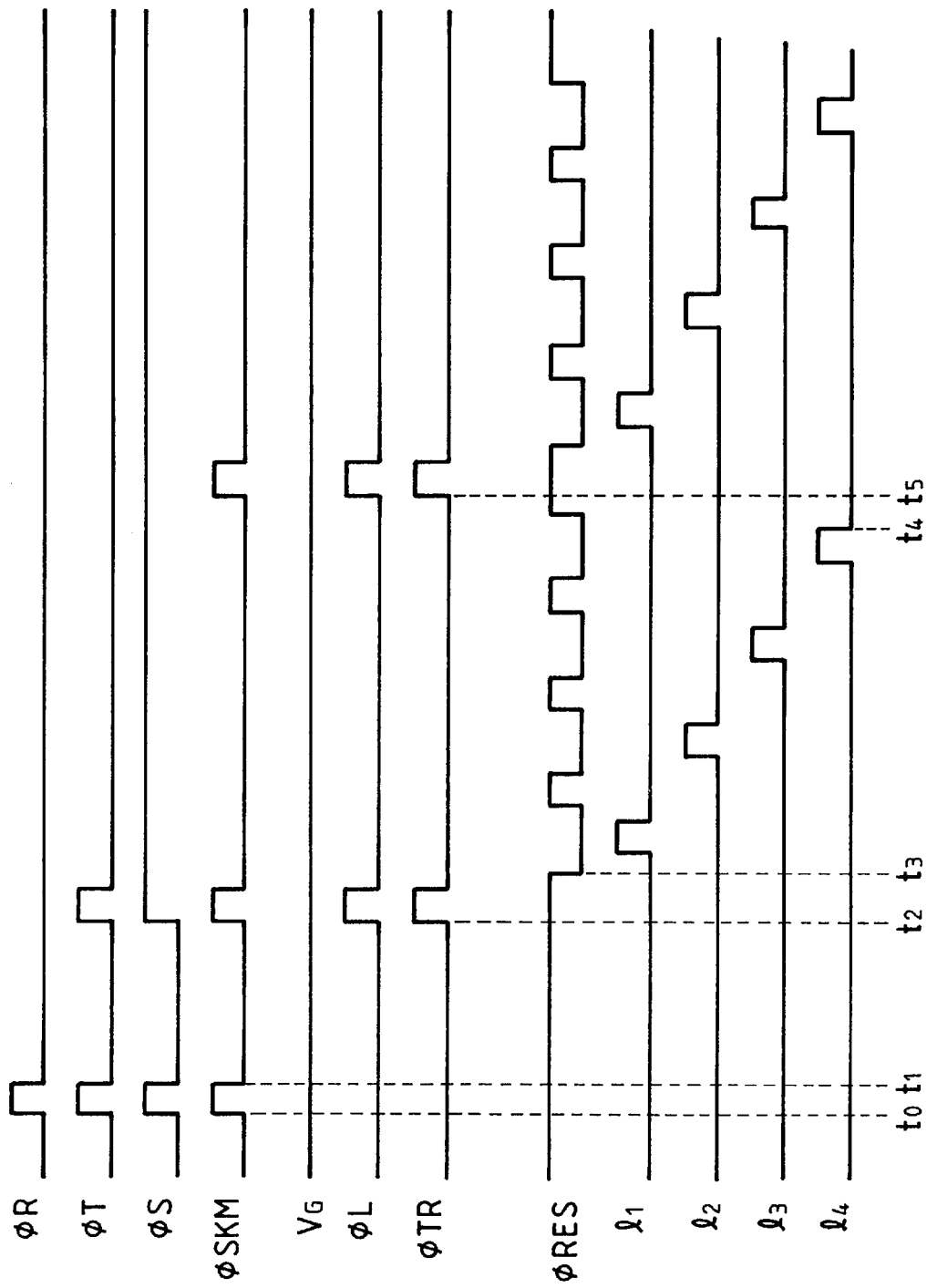
FIG. 3 is a timing chart of the first embodiment of the present invention.
Figure 4:
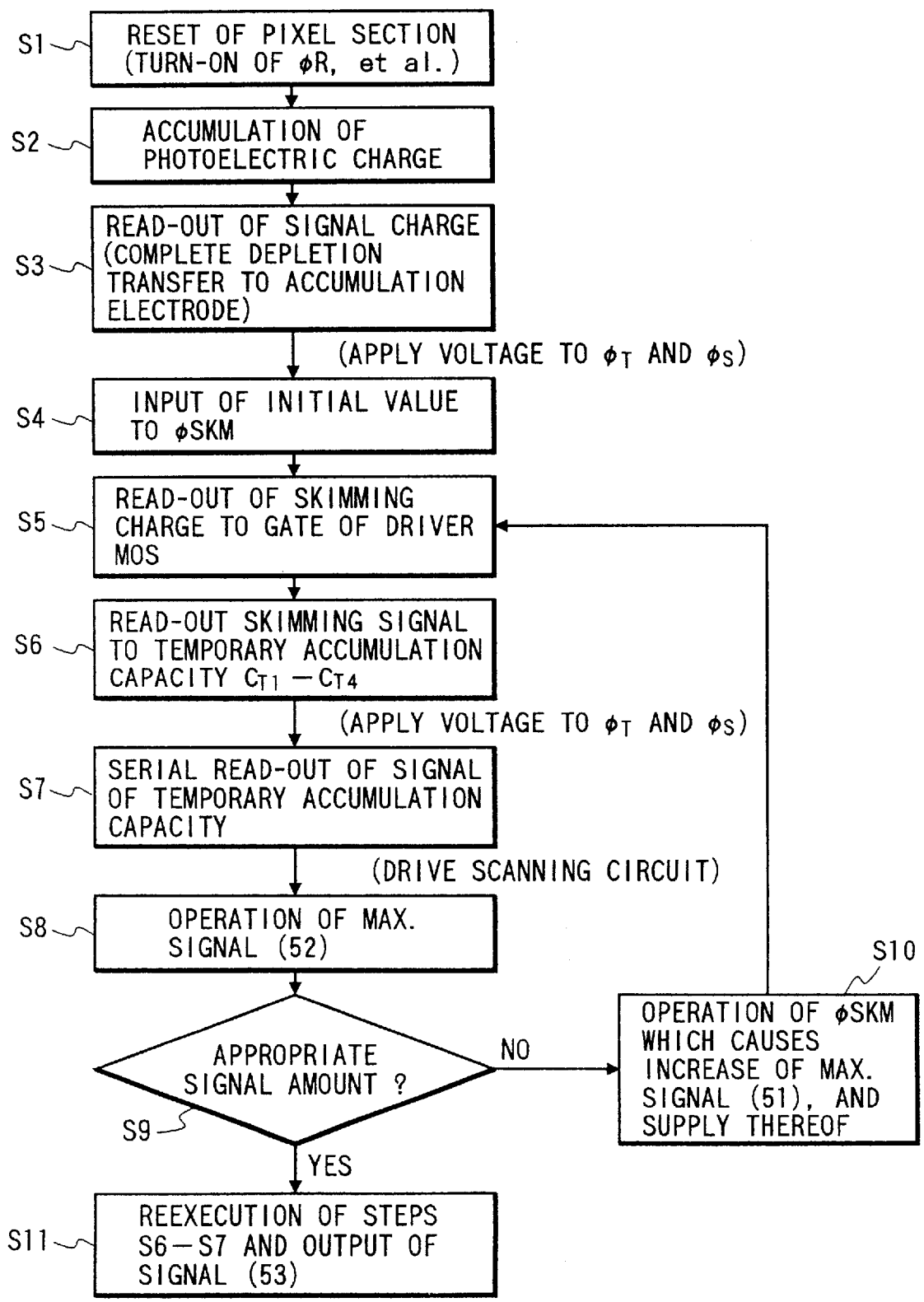
FIG. 4 is a flow chart showing the operation according to the first embodiment of the present invention.

FIG. 3 is a timing chart of the circuit in FIG. 2, and FIG. 4 is a flow chart showing the control scheme and operation of the circuit in FIG. 2.

The operation of this embodiment will be briefly described below with reference to FIGS. 3 and 4.

At time $t_0$, pulses $\phi_R$, $\phi_T$, and $\phi_{SKM}$ are applied to reset the residual charges in the pixels. Upon completion of resetting ($t_1$), accumulation of photoelectric charges is started.

At time $t_2$, when pulses $\phi_T$ and $\phi_S$ are applied, and a pulse $\phi_{SKM}$ of an initial voltage is applied to the skimming electrodes, skimming charges corresponding to the applied voltage are read out to the floating gates of the transistors 2 of the respective pixels. At this time, when pulses $\phi_L$ and $\phi_{TR}$ are also applied, the source-follower amplifiers of the respective pixels operate to read out pixel signals to capacitors $C_{T1}$ to $C_{T4}$.

Thereafter, a scanning circuit 21 is operated from times $t_3$ to $t_4$ to serially read out the signals from the capacitors $C_{T1}$ to $C_{T4}$ to an output terminal 53, and the circuit block 52 obtains, e.g., the maximum value of these signals.

The circuit block 51 generates an optimal skimming voltage $\phi_{SKM}$ in accordance with the obtained maximum signal amount, and applies it to the respective pixel at time $t_5$ to perform skimming transfer and signal read again.

By repeating the series of operations described above, an optimal skimming signal can be obtained.

In the above description, after skimming transfer, the pixels continue charge accumulation without resetting the accumulation electrodes. Alternatively, the accumulation electrode and pixel portions may be reset in each scan and thereafter, accumulation may be resumed.

Figure 5:
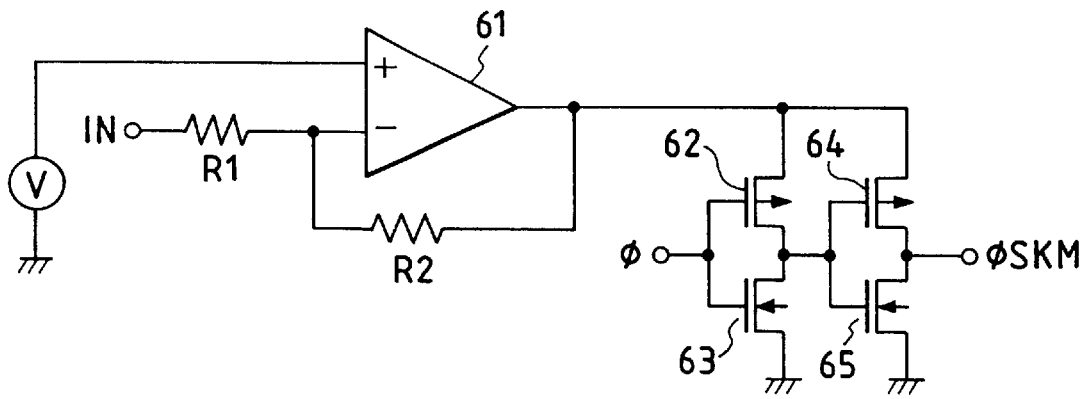
FIG. 5 is a circuit diagram of an automatic skimming voltage control circuit according to the first embodiment of the present invention.

FIG. 5 shows an example of an automatic setting circuit of a skimming voltage during the accumulation period, which is denoted by 51 in FIG. 2. In this circuit, an input signal (the signal output from an output amplifier 54 in FIG. 2) is inverted and amplified by an inverting amplifier 61, and its output voltage is reflected in the amplitude of the pulse $\phi_{SKM}$ More specifically, as the input signal is smaller, the amplitude of the pulse $\phi_{SKM}$ becomes larger to automatically increase the amount of skimming charges to be transferred.

Figure 6A:
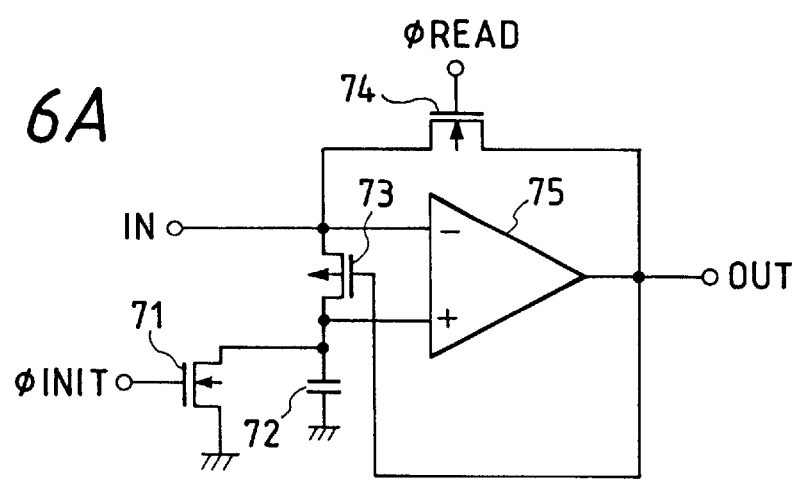
FIGS. 6A and 6B are respectively a circuit diagram and a timing chart of a maximum value detection circuit for a pixel signal according to the first embodiment of the present invention.
Figure 6B:
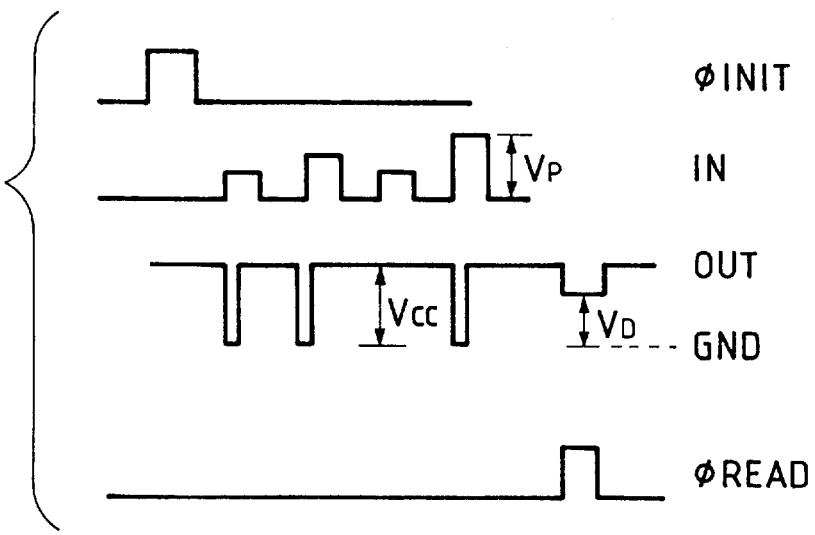

FIGS. 6A and 6B show an example of a circuit for detecting the maximum value of skimming charge signals of the respective pixels, which circuit is denoted by 52 in FIG. 2. FIG. 6A is a circuit diagram, and FIG. 6B is a timing chart thereof. In the circuit operation, a pulse $\phi_{INIT}$ changes to Hi-level to turn on a MOS switch 71, thereby resetting a capacitor 72. Thereafter, every time a signal is input, the input signal is compared with a voltage in the capacitor 72. If the input signal is lower than the voltage in the capacitor 72, a pulse OUT changes to $V_{CC}$ level shown in FIG. 6B; otherwise, the pulse OUT changes to GND level. As a consequence, a PMOS 73 is turned on, and the input signal is written in the capacitor 72. Upon completion of a series of operations, a pulse $\phi_{READ}$ changes to high-level to turn on a MOS switch 74 so as to form a feedback loop, thereby outputting the voltage in the capacitor 72.

Figure 7:
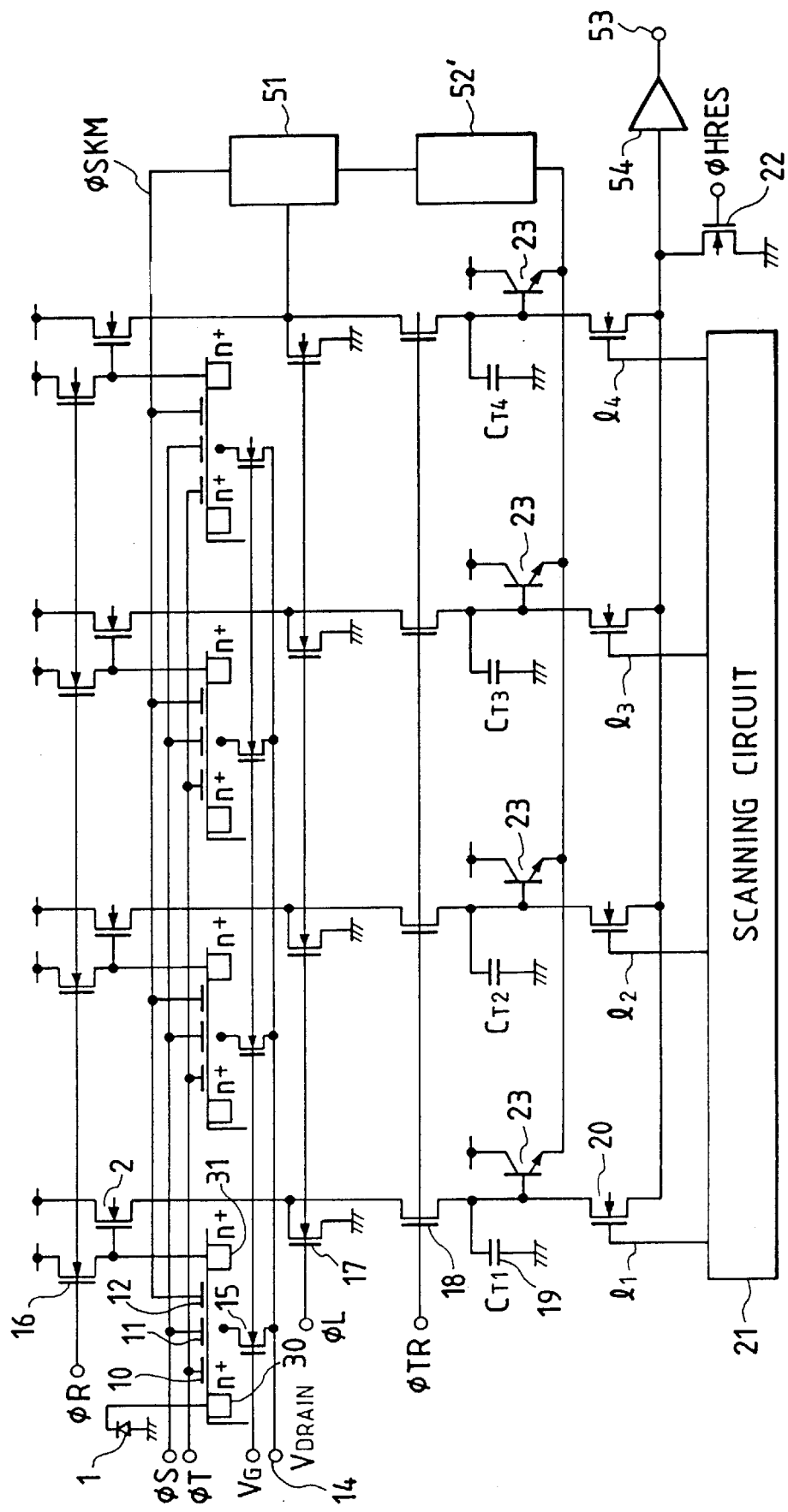
FIG. 7 is a circuit diagram of the second embodiment of the present invention.

FIG. 7 is a circuit diagram showing the second embodiment, which is substantially the same as the first embodiment, except for means for detecting a maximum value of pixels.

In FIG. 7, an NPN transistor 23 is inserted in the output line of each pixel, and its emitter is commonly connected. With this arrangement, when signals are read out from the respective pixels to capacitors $C_1$ to $C_4$, the maximum value of the signals can be immediately obtained.

In this case, a circuit 52' may be a simple buffer amplifier.

Figure 8:
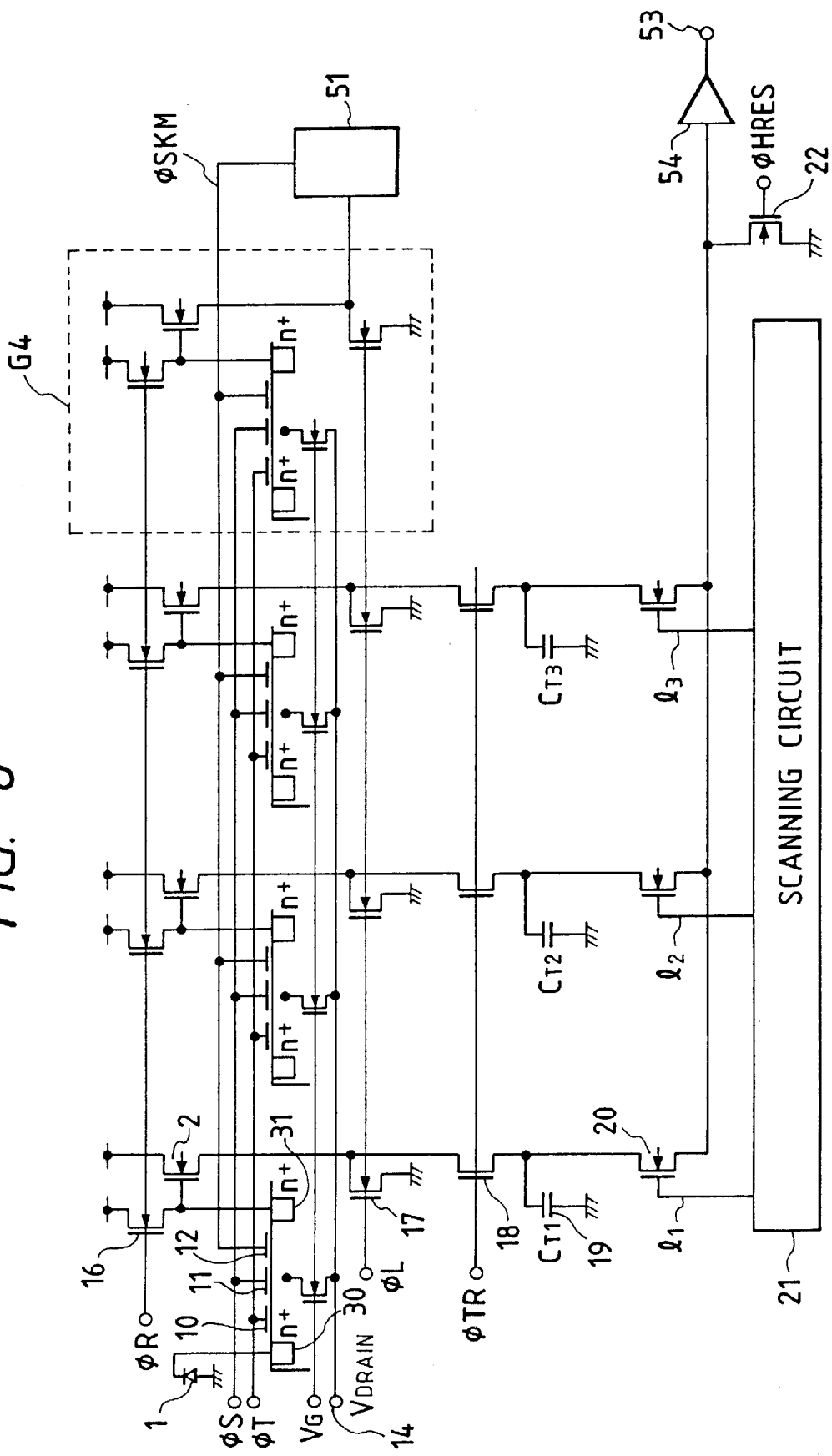
FIG. 8 is a circuit diagram of the third embodiment of the present invention.

FIG. 8 shows the third embodiment, which is substantially the same as the first embodiment, except that the means for detecting the maximum signal of pixels is replaced by means for detecting background light.

In FIG. 8, for example, a pixel G4 enclosed in the dotted line serves as a dummy pixel, which is arranged at a position where no signal light is incident, and the voltage of background light is obtained based on the output from this pixel, thereby controlling the skimming voltage.

Figure 9:
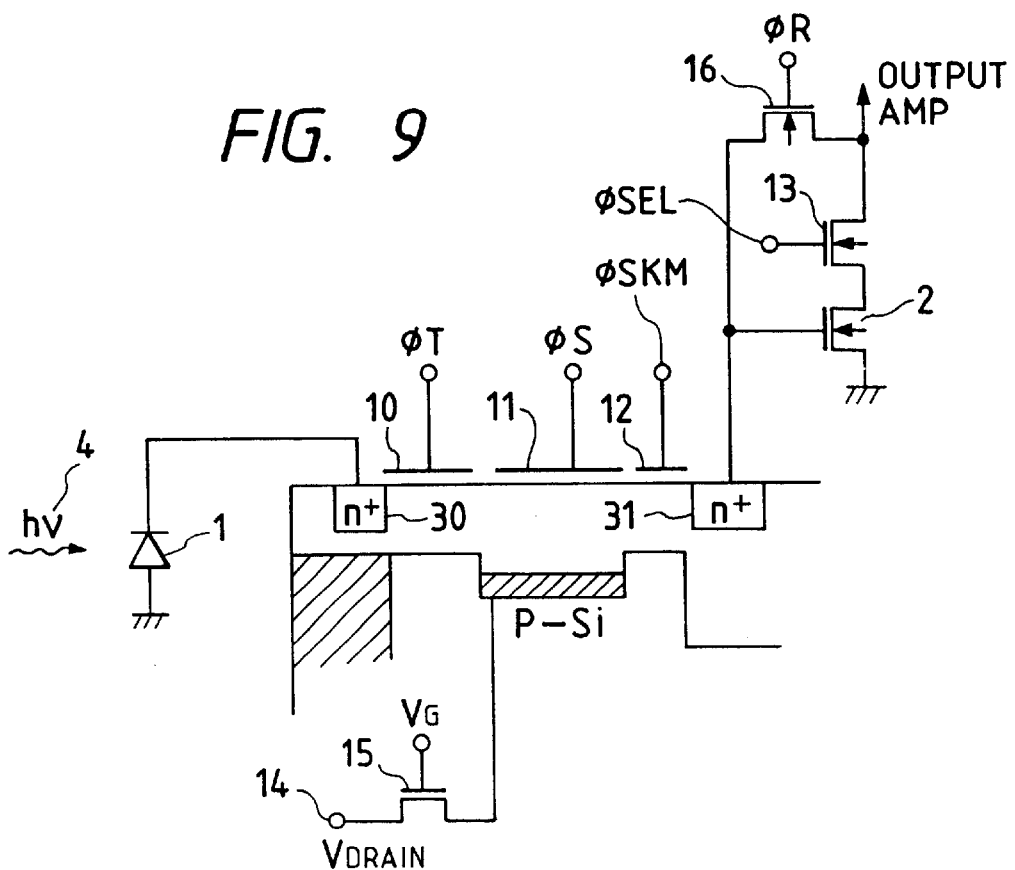
FIG. 9 is a circuit diagram of a circuit for one pixel according to the fourth embodiment of the present invention.

FIG. 9 is a circuit diagram of a photoelectric conversion element according to the fourth embodiment of the present invention.

This embodiment is substantially the same as the first embodiment, except that the output amplifier in the device described in the first embodiment is replaced by an NMOS inversion circuit. With this arrangement, the gain can be set to be 1 or more. Note that the same reference numerals in FIG. 9 denote the same parts as those in FIGS. 1A to 1C, and a detailed description thereof will be omitted.

Figure 10:
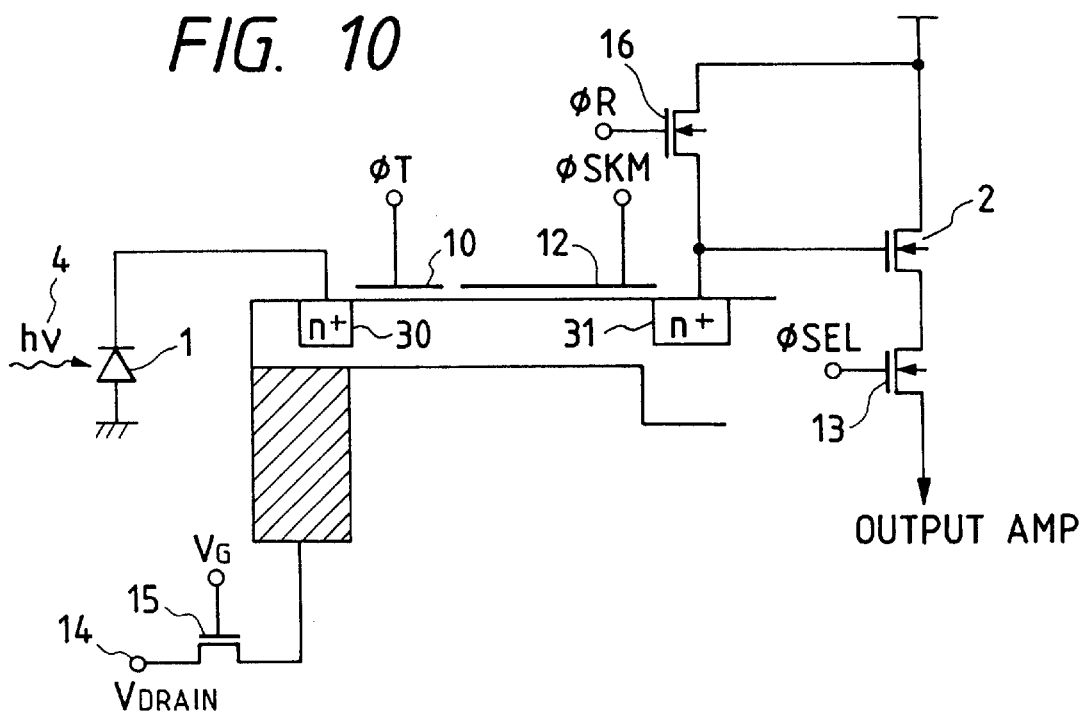
FIG. 10 is a circuit diagram of a circuit for one pixel according to the fifth embodiment of the present invention.
Figure 11A:
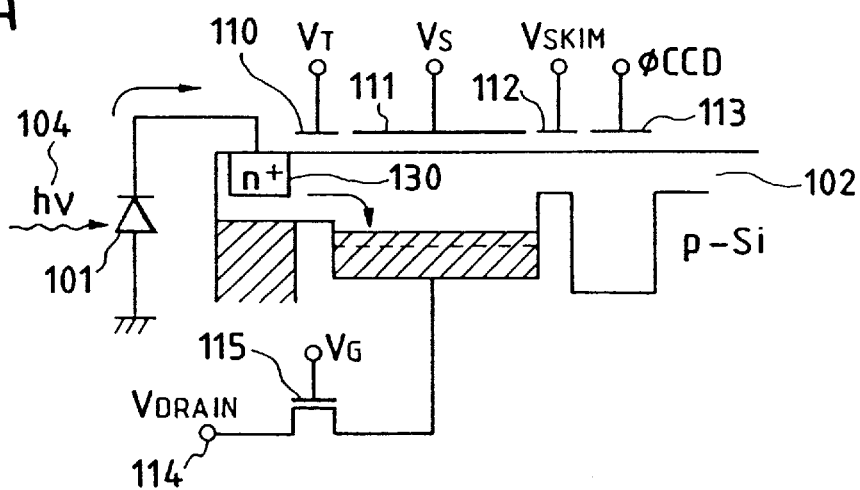
FIGS. 11A to 11C are circuit diagrams for explaining the conventional charge skimming scheme.
Figure 11B:
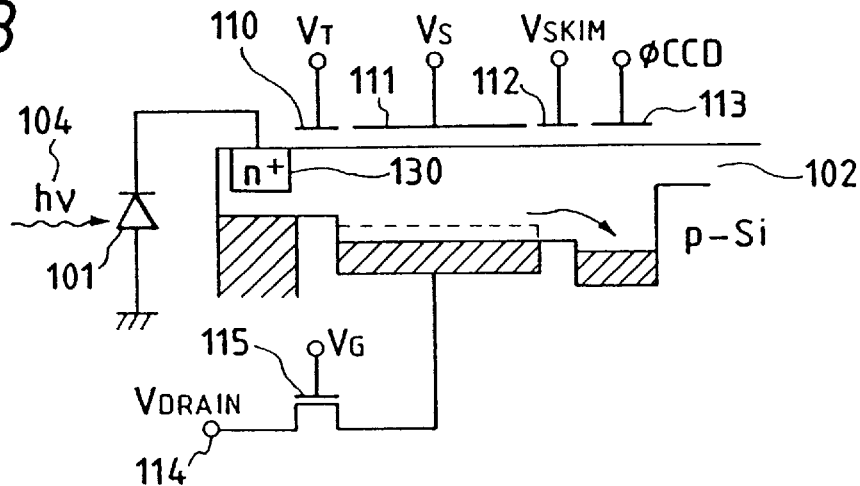
Figure 11C:
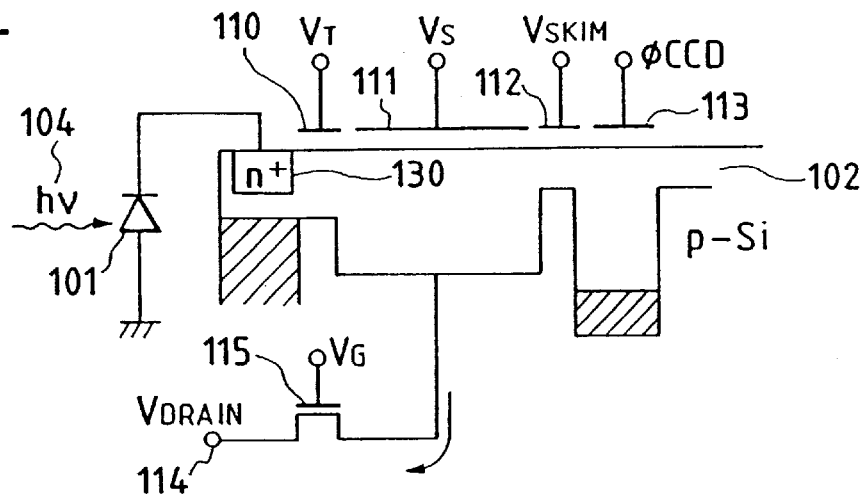

FIG. 10 is a circuit diagram of a photoelectric conversion element according to the fifth embodiment of the present invention.

In this embodiment, the skimming electrode 12 alone is arranged to also play roles of the input gate electrode and the accumulation electrode in the above-mentioned embodiment.

After skimming charges of those produced by a photodiode are transferred to an n$^+$-type region 31, the residual charges are ejected by a MOS switch 15 arranged in an n$^+$-type region 30.

The amount of skimming charges is controlled by the skimming electrode 12 in the same manner as in the above embodiment.

In the above embodiments, the photoelectric conversion device which reads out a photoelectric signal by transferring it to the gate electrode of the MOS transistor has been described. The present invention can also be applied to other photoelectric conversion devices such as a FGA (floating gate array device), an AMI (amplified MOS intelligent imager), a BASIS (base-stored image sensor), and the like.

In the above embodiments, a one-dimensional photoelectric conversion device has been exemplified. However, the same effect can be obtained even when the present invention is applied to a two-dimensional photoelectric conversion device.

In the above embodiments, n-type layers are used as the diffusion layers 30 and 31. Alternatively, an n-type semiconductor substrate and p-type diffusion layers may be used.

As described above, according to the present invention, since, for example, the MOS transistor is used as the accumulation means of skimming charges in place of a CCD which is used in the conventional device, a charge skimming transfer type photoelectric conversion device which can remove background signal components as in the conventional device, and can yet provide a signal with a high S/N ratio and, hence, high contrast, can be realized.

Also, according to the present invention, since the skimming voltage can be automatically controlled in real time, an optimal skimming charge amount can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion device, comprising:
   (A) a plurality of pixels, each pixel of said plurality of pixels including:
      photoelectric conversion means for converting light into photoelectric charges;
      transfer means for transferring a portion of the photoelectric charges from said photoelectric conversion means; and
      reading means formed with a transistor for amplifying and non-destructively outputting a signal corresponding to the portion of the photoelectric charges transferred by said transfer means, from a control electrode to a main electrode of the transistor; and
   (B) controlling means for controlling an amount of photoelectric charges transferred by said transfer means,
      wherein said controlling means controls the amount of photoelectric charges transferred by said transfer means, based on an output of said reading means.

2. A photoelectric conversion device, comprising:
   (A) a plurality of pixels, each pixel of said plurality of pixels including:
      photoelectric conversion means for converting light into photoelectric charges;
      transfer means for transferring a portion of the photoelectric charges from said photoelectric conversion means; and
      reading means for non-destructively outputting a signal corresponding to the portion of the photoelectric charges transferred by said transfer means; and
   (B) controlling means for controlling an amount of photoelectric charges transferred by said transfer means,
      wherein said controlling means controls the amount of photoelectric charges transferred by said transfer means, based on the signal output by said reading means.

3. A photoelectric conversion device according to claim 2, further comprising comparison means for comparing the signal output by said reading means with a predetermined level,
   wherein said controlling means variably controls the amount of photoelectric charges transferred according to a result of the comparison by said comparison means.

4. A photoelectric conversion device, comprising:
   (A) a plurality of pixels, each pixel of said plurality of pixels including:
      photoelectric conversion means for converting light into photoelectric charges;
      transfer means for transferring a portion of the photoelectric charges from said photoelectric conversion means; and
      reading means formed with a transistor for amplifying and non-destructively outputting a signal corresponding to the portion of the photoelectric charges transferred by said transfer means, from a control electrode to a main electrode of the transistor; and
   (B) controlling means for controlling said transfer means,
      wherein said controlling means includes pulse setting means for changing a pulse signal and said controlling means controls the amount of photoelectric charges transferred by said transfer means in response to an output from said pulse setting means, based on an output of said reading means.

5. A photoelectric conversion device comprising:
   (A) a plurality of pixels, each pixel of said plurality of pixels including:
      photoelectric conversion means for converting light into photoelectric charges;
      transfer means for transferring a portion of the photoelectric charges from said photoelectric conversion means; and
      reading means for non-destructively outputting a signal corresponding to the portion of the photoelectric charges transferred by said transfer means; and
   (B) controlling means for controlling said transfer means,
      wherein said controlling means includes pulse setting means for changing a pulse signal and said controlling means controls the amount of photoelectric charges transferred in response to an output from said pulse setting means,
      wherein said pulse setting means changes the pulse signal in response to the signal output by said reading means.

6. A photoelectric conversion device according to claim 5, further comprising comparison means for comparing the signal output by said reading means with a predetermined level,
   wherein said pulse setting means changes the pulse signal according to a result of the comparison by said comparison means.

7. A photoelectric conversion device, comprising:
(A) a plurality of pixels, each pixel of said plurality of pixels comprising:
photoelectric conversion means for converting light into photoelectric charges;
transfer means for transferring a portion of the photoelectric charges from said photoelectric conversion means; and
reading means for non-destructively outputting a signal corresponding to the portion of the photoelectric charges transferred by said transfer means; and
(B) controlling means for controlling An amount of photoelectric charge transferred based on the signal output by said reading means.

8. A photoelectric conversion device according to claim 7, further comprising comparison means for comparing the signal output by said reading means with a predetermined level,
wherein said controlling means controls the amount of photoelectric charge transferred based on a result of the comparison by said comparison means.

9. A photoelectric conversion device, comprising:
(A) a plurality of pixels, each pixel of said plurality of pixels including:
photoelectric conversion means for converting light into photoelectric charges;
transfer means for transferring a portion of the photoelectric charges from said photoelectric conversion means; and
reading means formed with a transistor for amplifying and non-destructively outputting a signal corresponding to the portion of the photoelectric charges transferred by said transfer means, from a control electrode to a main electrode of the transistor; and
(B) controlling means for controlling said transfer means, said controlling means controlling said transfer means by a method that includes a first step of controlling said transfer means according to a first control signal and a second step of controlling said transfer means according to a second control signal that differs from the first control signal, wherein said controlling means controls an amount of photoelectric charges transferred by said transfer means, based on an output of said reading means.

10. A photoelectric conversion device according to claim 9, wherein the first and second control signals are pulse signals having different pulse widths.

11. A photoelectric conversion device, comprising:
(A) a plurality of pixels, each pixel of said plurality of pixels including:
photoelectric conversion means for converting light into photoelectric charges;
transfer means for transferring a portion of the photoelectric charges from said photoelectric conversion means; and
reading means for non-destructively outputting a signal corresponding to the portion of the photoelectric charges transferred by said transfer means; and
(B) controlling means for controlling said transfer means, said controlling means controlling said transfer means by a method that includes a first step of reading the signal output by said reading means and a second step of controlling an amount of photoelectric charge transferred from said photoelectric conversion means based on the signal output by said reading means.

12. A device according to claim 1, wherein said transistor includes a MOS transistor.

13. A device according to claim 4, wherein said transistor includes a MOS transistor.

14. A device according to claim 9, wherein said transistor includes a MOS transistor.

* * * * *

UNITED STATES PATENT AND TRADEMARK OFFICE
CERTIFICATE OF CORRECTION

PATENT NO.   : 6,342,920 B2
DATED        : September 29, 1999
INVENTOR(S)  : Isamu Ueno It is certified that error appears in the above-identified patent and that said Letters Patent is hereby corrected as shown below:

Column 2,
Line 22, "comprising-a" should read -- comprising a --; and
Line 31, "object,according" should read -- object, according --.

Column 7,
Line 16, ".array" should read -- array --.

Column 9,
Line 12, "An" should read -- an --.

Signed and Sealed this

Ninth Day of July, 2002

*Attest:*

JAMES E. ROGAN
*Director of the United States Patent and Trademark Office*

*Attesting Officer*